United States Patent
Ott et al.

(10) Patent No.: US 6,791,297 B2
(45) Date of Patent: Sep. 14, 2004

(54) BATTERY CHARGER

(75) Inventors: William E. Ott, Phoenix, AZ (US); David L. Saunders, Surprise, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/201,190

(22) Filed: Jul. 22, 2002

(65) Prior Publication Data

US 2004/0012371 A1 Jan. 22, 2004

(51) Int. Cl.[7] ................................................. H02J 7/00
(52) U.S. Cl. ..................................... 320/116; 320/118
(58) Field of Search ............................... 320/116, 117, 320/118, 119, 120, 123, 124, 126, 127

(56) References Cited

U.S. PATENT DOCUMENTS

| | | | |
|---|---|---|---|
| 4,238,721 A | * | 12/1980 | DeLuca et al. ............. 320/122 |
| 5,412,305 A | | 5/1995 | Jeanneret |
| 5,754,028 A | | 5/1998 | Vezzini |
| 5,909,360 A | * | 6/1999 | Lavin et al. ................. 307/66 |
| 5,946,202 A | * | 8/1999 | Balogh ........................ 363/26 |
| 6,297,616 B1 | * | 10/2001 | Kubo et al. ................. 320/116 |
| 6,377,023 B1 | | 4/2002 | Capel |
| 6,377,024 B1 | * | 4/2002 | Choy ......................... 320/118 |

FOREIGN PATENT DOCUMENTS

| | | |
|---|---|---|
| EP | 1296435 A | 3/2003 |
| WO | WO 9921241 A | 4/1999 |

* cited by examiner

Primary Examiner—Lawrence Luk

(57) ABSTRACT

A battery charger charges a plurality of battery portions (204–214) connected in series with one another, a battery portion comprising at least one cell. The battery charger includes a battery portion charger (100) having an output that is electrically floating with respect to a DC power source utilized to power the battery portion charger. The battery portion charger is arranged to be coupled in parallel with a corresponding one of the plurality of battery portions. The battery charger also includes a controller (232) for controlling the battery portion charger.

12 Claims, 2 Drawing Sheets

BATTERY CHARGER

FIELD OF THE INVENTION

This invention relates in general to battery chargers, and more specifically to a battery charger for charging a plurality of cells connected in series with one another.

BACKGROUND OF THE INVENTION

Batteries often are made up of a plurality of individual cells, or portions, connected in series to achieve a desired overall battery voltage. In some kinds of batteries, e.g., lithium ion batteries, when bulk charging the overall battery, the individual cells can charge at different rates. Once a first individual cell reaches full charge, the bulk charging process must stop to avoid overcharging. This can leave other individual cells at less than full capacity.

In addition, some applications can have circuitry that requires more than one supply voltage for its operation. In such applications, the overall battery voltage supplied from all battery portions in series can be utilized for some of the circuitry, while a fraction of the battery portions can be utilized to power other parts of the circuitry at a lower voltage. Such applications can produce an asymmetrical loading on the battery portions, leaving some battery portions more depleted than others.

Thus, what is needed is a battery charger that can bring all the individual cells, or battery portions, up to full capacity without overcharging the battery.

SUMMARY OF THE INVENTION

An aspect of the present invention is a battery charger for charging a plurality of cells connected in series with one another. The battery charger comprises a plurality of cell chargers, each cell charger having an output that is electrically floating with respect to a direct current (DC) power source utilized to power the cell charger. The cell charger is arranged to be coupled in parallel with a corresponding one of the plurality of cells. The battery further comprises a controller coupled to the plurality of cell chargers for controlling the plurality of cell chargers.

Another aspect of the present invention is a battery charger for charging a plurality of battery portions connected in series with one another, with a battery portion comprising at least one cell. The battery charger comprises a plurality of battery portion chargers, each battery portion charger having an output that is electrically floating with respect to a direct current (DC) power source utilized to power the battery portion charger. The battery portion charger is arranged to be coupled in parallel with a corresponding one of the plurality of battery portions. The battery charger further comprises a controller coupled to the plurality of battery portion chargers for controlling the plurality of battery portion chargers.

A third aspect of the present invention is a cell charger for a battery charger for charging a plurality of cells connected in series with one another. The cell charger comprises an output that is electrically floating with respect to a direct current (DC) power source utilized to power the cell charger. The cell charger is arranged to be coupled in parallel with a corresponding one of the plurality of cells. The cell charger further comprises a controller interface for interfacing with a controller for controlling the cell charger.

A fourth aspect of the present invention is a battery portion charger for a battery charger for charging a plurality of battery portions connected in series with one another, with a battery portion comprising at least one cell. The battery portion charger comprises an output that is electrically floating with respect to a direct current (DC) power source utilized to power the battery portion charger. The battery portion charger is arranged to be coupled in parallel with a corresponding one of the plurality of battery portions. The battery portion charger further comprises a controller interface for interfacing with a controller for controlling the battery portion charger.

DETAILED DESCRIPTION

Figure 1:
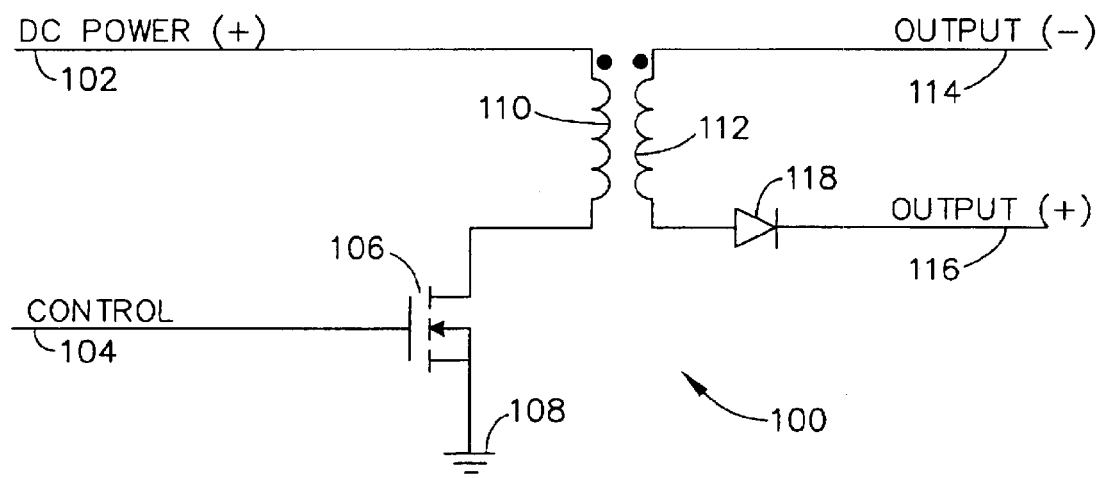
FIG. 1 is an electrical block diagram of an exemplary battery portion charger in accordance with the present invention.

Referring to FIG. 1, an electrical block diagram depicts an exemplary battery portion charger 100 in accordance with the present invention, comprising a direct current (DC) power input node 102 for supplying current from a DC power source 234 (FIG. 2) to the battery portion charger 100. The battery portion charger 100 further comprises a transformer, including a transformer primary winding 110 coupled to the DC power input node 102 and coupled to a switching element 106, which acts as a generator for energizing the transformer primary winding 110. The switching element 106 comprises a control node 104, which acts as a controller interface for controlling a current through the switching element 106 and the transformer primary winding 110. The switching element 106 is coupled to a common node 108 for returning the current to the DC power source 234. In one embodiment, the switching element 106 is an N-channel MOSFET, having its source connected to the common node 108, its gate connected to the control node 104, and its drain connected to the transformer primary winding 110. It will be appreciated that, alternatively, other types of devices can be utilized for the switching element 106.

The transformer also includes a transformer secondary winding 112 mutually coupled to the transformer primary winding 110. One side of the transformer secondary winding 112 is coupled through a diode 118 to a positive charging output 116, and the other side is coupled to a negative charging output 114. The transformer output advantageously provides electrical isolation, which allows the positive and negative charging outputs 116, 114 to be coupled in parallel with a portion of a series-connected multi-cell battery without interfering with other similar battery portion chargers that are coupled in parallel with other portions of the same battery.

In one embodiment, a controller 232 (FIG. 2) supplies a control signal to the control node 104 for controlling the battery portion charger 100. The control signal can, for example, be a square wave varying between zero and a positive voltage, e.g., 10 volts, sufficient to turn the switching element 106 "on" for a nominal 25 percent duty cycle. It will be appreciated that the controller 232 can easily maintain the desired charging current by adjusting the duty cycle to compensate for variations in parameters such as temperature and DC power source voltage. This ease of adjustment is an advantage of the topology used in the battery portion charger 100 in accordance with the present invention.

The polarity of the transformer windings and the diode 118 are such that, when the switching element 106 is on, current flows in the transformer primary winding 110, but not in the transformer secondary winding 112. When the switching element 106 turns off, during the output cycle, a substantially-constant current flows through the transformer secondary winding 112 whenever a battery portion is coupled thereto. The amount of energy transferred to the battery portion during the output cycle depends upon the pulse width of the control signal and the magnetic characteristics of the transformer primary and secondary windings 110, 112. In an embodiment for charging a 4.1-volt cell, a pulse width of 20 microseconds and a period of 40 microseconds were used with a transformer primary inductance of 150 uH, a transformer secondary inductance of 1.85 uH, a mutual coupling of 0.99, and a DC supply voltage of 28 volts. It will be appreciated that many other circuit parameters and voltages can be utilized as well, depending upon the nature of the charging application.

Figure 2:
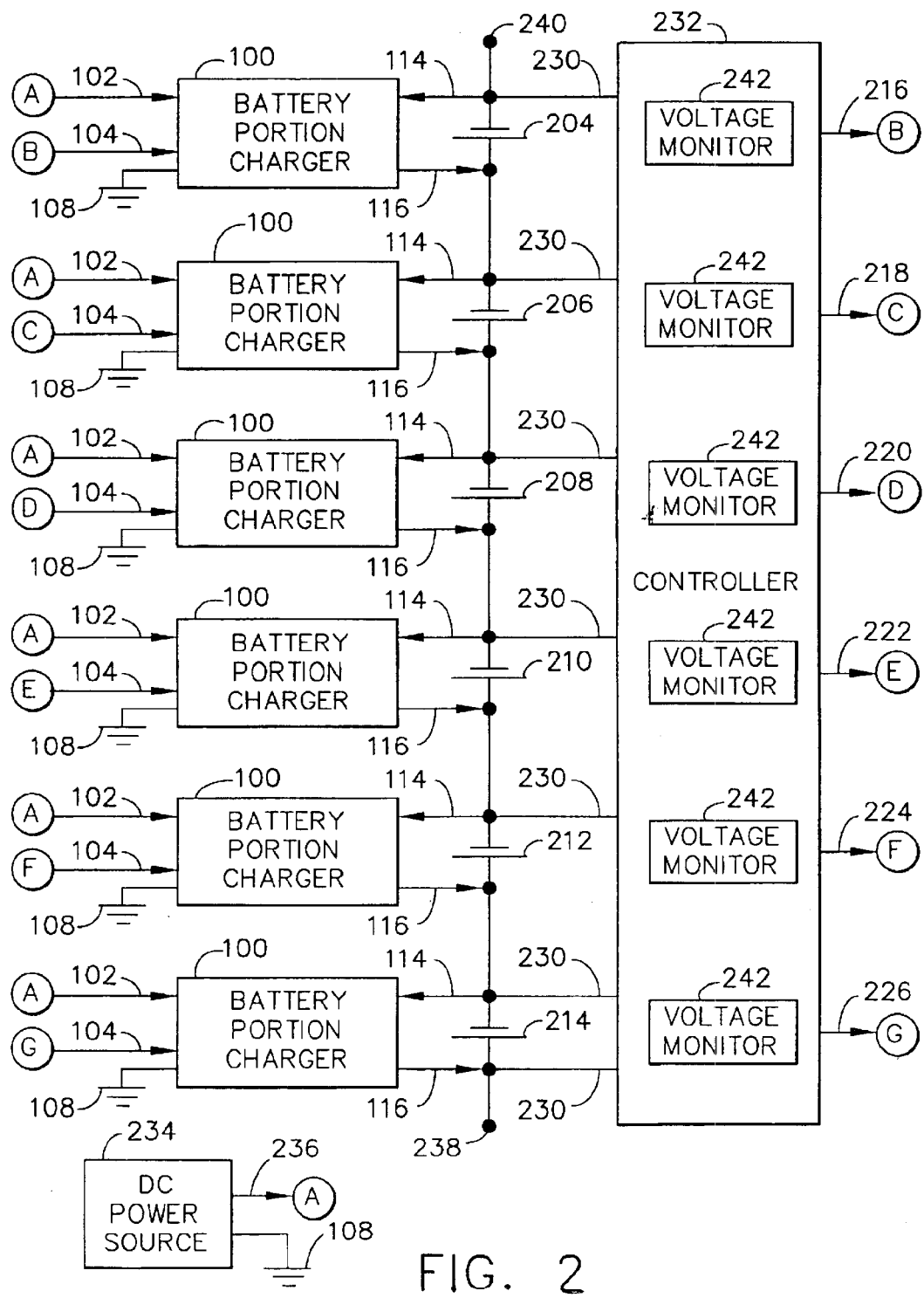
FIG. 2 is an electrical block diagram of an exemplary battery charger in accordance with the present invention, coupled to a DC power source and a plurality of series-connected cells to be charged.

Referring to FIG. 2, an electrical block diagram depicts an exemplary battery charger in accordance with the present invention, coupled to the DC power source 234, and further coupled to a plurality of series-connected cells 204–214 to be charged. The series-connected cells 204–214 preferably provide an overall battery voltage available at a pair of battery output nodes 238, 240. The battery charger comprises a plurality of battery portion chargers 100, each battery portion charger 100 having charging outputs 114, 116 that are electrically floating with respect to the DC power source 234 utilized to power the plurality of battery portion chargers 100 from a power output node 236 coupled to the DC power input node 102 of each of the battery portion chargers 100. The battery portion chargers 100 also preferably share the common node 108 with the DC power source 234. Each battery portion charger 100 is coupled in parallel with a corresponding one of the plurality of cells 204–214 through the charging outputs 114, 116 for supplying a constant charging current to that cell when called for by the controller 232.

The battery charger further comprises the controller 232 coupled to the plurality of battery portion chargers 100 for controlling the plurality of battery portion chargers 100. The controller 232 preferably includes a plurality of sense inputs 230 coupled to the plurality of cells 204–214 for sensing the voltages of the plurality of cells 204–214. The controller 232 also includes a plurality of voltage monitors 242 coupled to the plurality of sense inputs 230 for monitoring the voltage of each of the plurality of cells, and further coupled to a plurality of controller outputs 216–226. The controller outputs 216–226 are coupled to the control node 104 of corresponding ones of the plurality of battery portion chargers 100 for controlling each of the plurality of battery portion chargers 100 through well-known techniques, in response to the voltage sensed at the corresponding cell 204–214 charged by the battery portion charger 100. The particular structure of the controller 232 can vary, depending on the application for which the battery charger is intended. A good example of a suitable controller 232 intended for use with a high-capacity lithium ion battery is disclosed in U.S. patent application, entitled "CELL BUFFER WITH BUILT-IN TEST", filed by William E. Ott et al. on Jul. 1, 2002, which is hereby incorporated by reference.

It will be appreciated that, while each "battery portion" depicted for the exemplary battery charger of FIG. 2 consists of a single cell, a battery portion can also include multiple cells. Indeed, the battery charger in accordance with the present invention can just as easily be applied to a mixture of single-cell battery portions and multiple-cell battery portions, each of the battery portions connected in series with one another. For such mixtures, the electrical and magnetic parameters of each battery portion charger 100 preferably are proportioned for an appropriate energy transfer in accordance with the capacity of the particular battery portion being charged by the battery portion charger 100. For applications in which each of the plurality of battery portions consists of a single cell, the battery portion charger 100 is sometimes referred to herein as a "cell charger."

Figure 3:
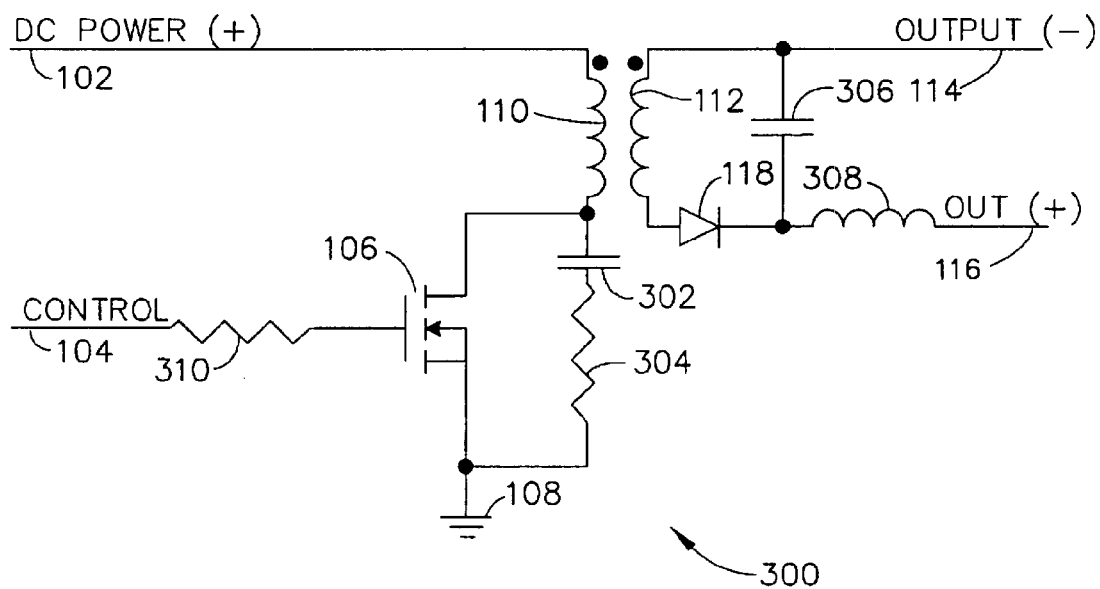
FIG. 3 is an electrical block diagram of the exemplary battery portion charger in accordance with the present invention, modified for EMI suppression.

Referring to FIG. 3, an electrical block diagram 300 of the exemplary battery portion charger 100 in accordance with the present invention, modified to suppress electromagnetic interference (EMI), is similar to the battery portion charger 100 depicted in FIG. 1, the essential difference being the addition of conventional elements 302–310, which are intended to suppress EMI that can be generated by the unmodified battery portion charger 100. The elements 302–310 preferably are added when the battery portion charger 100 is used in applications sensitive to EMI. The exact values of the elements 302–310 are application-dependent and will be well-understood by one of ordinary skill in the art.

Thus, it should be clear from the preceding disclosure that the present invention provides a battery charger that can bring all the individual cells, or battery portions, of a battery up to full capacity without overcharging the battery. Advantageously, the battery charger employs a battery portion charger that can be coupled in parallel with a portion of a series-connected multi-cell battery without interfering with other similar battery portion chargers that are coupled in parallel with other portions of the same battery.

Many modifications and variations of the present invention are possible in light of the above teachings. Thus, it is to be understood that, within the scope of the appended claims, the invention can be practiced other than as described herein above.

What is claimed is:

1. A battery charger for charging a plurality of cells connected in series with one another, the buttery charger comprising:

a plurality of cell chargers, each cell charger having an output that is electrically isolated from a direct current (DC) power source utilized to power the cell charger, each cell charger output adapted to be coupled in parallel with a corresponding one of the plurality of cells, and each cell charger configured to generate a constant current through the one of the plurality of cells during an output cycle; and a controller coupled to the plurality of cell chargers and operable to control the plurality of cell chargers, wherein the output of each cell charger comprises a transformer output for providing electrical isolation from the DC power source.

2. The battery charger of claim 1, wherein the controller comprises a plurality of cell voltage monitors arranged to be coupled to the plurality of cells, wherein the plurality of cell voltage monitors, when so coupled, monitor individual cell voltages of the plurality of cells.

3. The battery charger of claim 1, wherein each cell charger comprises a transformer input magnetically coupled to the transformer output for exciting the transformer output; and a generator electrically coupled to the transformer input for energizing the transformer.

4. The battery charger of claim 1, wherein each cell charger further comprises a diode coupled in series with the transformer output for providing a direct-current output during an output cycle.

5. A battery charger for charging a plurality of battery portions connected in series with one another, a battery portion comprising at least one cell, the battery charger comprising:

a plurality of battery portion chargers, each battery portion charger having an output that is electrically isolated from a direct current (DC) power source utilized to power the battery portion charger, each battery portion charger output adapted to be coupled in parallel with a corresponding one of the plurality of battery portions, and each battery portion charger arranged to generate a constant current through the one of the plurality of battery portions during an output cycle; and a controller coupled to the plurality of battery portion chargers and operable to control the plurality of battery portion chargers, wherein the output of each battery portion charger comprises a transformer output for providing electrical isolation from the DC power source.

6. The battery charger of claim 5, wherein the controller comprises a plurality of battery portion voltage monitors arranged to be coupled to the plurality of battery portions, wherein the plurality of battery portion voltage monitors, when so coupled, monitor individual battery portion voltages of the plurality of battery portions.

7. The battery charger of claim 5, wherein each battery portion charger comprises a transformer input magnetically coupled to the transformer output for exciting the transformer output; and a generator electrically coupled to the transformer input for energizing the transformer.

8. The battery charger of claim 5, wherein each battery portion charger further comprises a diode coupled in series with the transformer output for providing a direct-current output during an output cycle.

9. A cell charger for a battery charger for charging a plurality of cells connected in series with one another, the cell charger comprising:

an output that is electrically isolated from a direct current (DC) power source utilized to power the cell charger, the cell charger output adapted to be coupled in parallel with a corresponding one of the plurality of cell and the cell charger configured to generate a constant current through the one of the plurality of cells during an output cycle and a controller interface adapted to couple to a controller, wherein the output comprises a transformer output for providing electrical isolation from the DC power source.

10. The cell charger of claim 9, further comprising a transformer input magnetically coupled to the transformer output for exciting the transformer output; and a generator electrically coupled to the transformer input for energizing the transformer.

11. The cell charger of claim 9, further comprising a diode coupled in series with the transformer output for providing a direct-current output during an output cycle.

12. A battery portion charger for a battery charger for charging a plurality of battery portions connected in series with one another, a battery portion comprising at least one cell, the battery portion charger comprising:

an output that is electrically isolated from a direct current (DC) power source utilized to power the battery portion charger, the battery portion charger output adapted to be coupled in parallel with a corresponding one of the plurality of battery portions, and the battery portion charger configured to generate a constant current through the one of the plurality of buttery portions during an output cycle; and a controller interface adapted to couple to a controller, wherein the output comprises a transformer output for providing electrical isolation from the DC power source.

* * * * *